United States Patent [19]

Bookout

[11] 4,347,952

[45] Sep. 7, 1982

[54] SERPENTINE MAGAZINE FOR CAN VENDERS

[75] Inventor: Floyd V. Bookout, Arlington Heights, Ill.

[73] Assignee: Rock-Ola Manufacturing Corporation, Chicago, Ill.

[21] Appl. No.: 199,012

[22] Filed: Oct. 20, 1980

[51] Int. Cl.[3] .................... B65G 59/06

[52] U.S. Cl. .................... 221/129; 221/289; 312/45

[58] Field of Search .................... 221/17, 92, 123, 124, 221/129, 131, 133, 289, 298; 312/45, 72; 211/49 D

[56] References Cited

U.S. PATENT DOCUMENTS

| | | | |
|---|---|---|---|
| 3,085,712 | 4/1963 | Skumawitz | 221/298 X |
| 3,498,497 | 3/1970 | Baxendale et al. | 221/116 |
| 3,831,806 | 8/1974 | Lindsey | 221/129 X |
| 4,287,992 | 9/1981 | Takemori | 312/45 X |
| 4,289,254 | 9/1981 | Spring | 221/298 X |

*Primary Examiner*—H. Grant Skaggs

*Attorney, Agent, or Firm*—McCaleb, Lucas & Brugman

[57] ABSTRACT

A multiple column magazine for storing cylindrical articles, such as canned beverages, useful in coin controlled vending machines, employing one or more of such magazines. Each magazine is made up of parallel side wall members having integrally related track portions extending into the space between adjacent wall members and forming a pair of non-overlapping serpentine columns separated in front to back relationship within the magazine. The track portions define continuous rails along which the canned articles gravitationally roll. Each serpentine column is loaded with articles from the front of the magazine and has an electrically operated vend mechanism at its lower end for the selected release of articles therefrom. The columns are characterized by substantially horizontal flights which merge with curvelinear flights to define serpentine rails for the movement of the cans and which are arranged to avoid jamming of articles in the columns, to maximize storage capacity therein, to accommodate different diameter canned articles and to minimize the effective load on the vend mechanism whereby the latter is readily removable for replacement or repair.

6 Claims, 3 Drawing Figures

SERPENTINE MAGAZINE FOR CAN VENDERS

BACKGROUND OF THE INVENTION

Increasing the storage capacity of a can vending machine obviously may be accomplished by altering the cabinet dimensions to thereby accommodate additional storage columns and by varying their height to increase capacity. However, the height, width and depth of a can vending machine cabinet have practical limits dictated by space limitations at the point of utilization. Thus, there has been and continues to be a striving toward more efficient use of the cabinet interiors with a design toward increasing storage capacity.

In the past, magazines have been presented involving a so-called staggered stack array of the cylindrical articles, as for example such as is taught in U.S. Pat. No. 3,883,038 of May 13, 1975. According to the teachings of that patent a multiple column storage system is provided in which canned articles are arrayed in staggered patterns in plural front-to-back columns of vertically extending magazine spaces.

In other instances, single serpentine track magazines have been employed. See for example, U.S. Pat. No. 3,613,945 issued Oct. 19, 1971. According to the teachings set forth in that patent a continuous serpentine track is provided along which the canned articles gravitationally roll from the upper end of the magazine to the discharge opening at the lower end thereof.

In still other instances, as taught in U.S. Pat. No. 3,437,239 of Apr. 8, 1969, a so-called slant shelf magazine is taught wherein a plurality of sloping planar shelves, support cans in parallel stacked array and feed into a common vertical drop chute leading to a discharge chute at the lower end of the magazine.

In other instances, as set out in U.S. Pat. No. 3,498,497 of Mar. 3, 1970, a double depth serpentine magazine is are taught in which a pair of serpentine tracks are provided in each magazine, one of the tracks being folded within the other and the same being composed of three opposing sets of track projections on opposing faces of parallel spaced magazine walls, with the intermediate or middle track thereof, being common to both serpentine tracks.

It is to this latter style of magazine that the present invention is directed; the same incorporating improved structural arrangements over the teachings of said U.S. Pat. No. 3,498,497 which lead to a more efficient utilization of the interior cabinet space, increased storage capacity and improved operational characteristics than heretofore provided by the prior art.

The primary objective of this invention to provide a dual serpentine magazine for utilization in automatic coin operated vending machines which exhibits increased storage capacity and a more efficient utilization of the vending machine's interior space.

Another object of this invention is to provide a dual serpentine magazine as aforesaid in which a pair of like serpentine article carrying columns are disposed in side by side relationship, one behind the other; a pair of parallel spaced side wall members each bearing integrally projecting serpentine track portions defining the dual serpentine track columns, in assembly.

Still another object of this invention is to provide a dual serpentine track magazine, particularly useful in can vending machines, which is front loading for both serpentine columns and which has dual vending mechanisms for controlling the discharge of articles one by one from the lower ends thereof; the serpentine columns being so designed as to avoid jamming of canned articles within the interior thereof, and to minimize the effective weight of articles at the lower end of the columns whereby to relieve the weight load on associated vending mechanisms.

The above and further objects, features and advantages of this invention will be recognized by those familiar with the art from the following detailed description of the preferred embodiment thereof, illustrated in the accompanying drawings and representing the best mode presently contemplated for carrying out the teachings of this invention.

IN THE DRAWINGS

FIG. 1 is a foreshortened vertical cross-sectional view, showing the configuration of a dual serpentine column magazine mounted within a vending machine cabinet in accordance with the teachings of this invention;

FIG. 2 is an enlarged cross-sectional view taken substantially along vantage line 2—2 of FIG. 1 and looking in the direction of the arrows thereon, and illustrating the structural makeup of a pair of adjacent serpentine columns; and FIG. 3 is an enlarged partial elevation of the lower discharge end of the front serpentine column illustrated in FIG. 1 to demonstrate the features of the vend mechanism associated therewith.

DESCRIPTION OF THE PREFERRED EMBODIMENT

Figure 1:
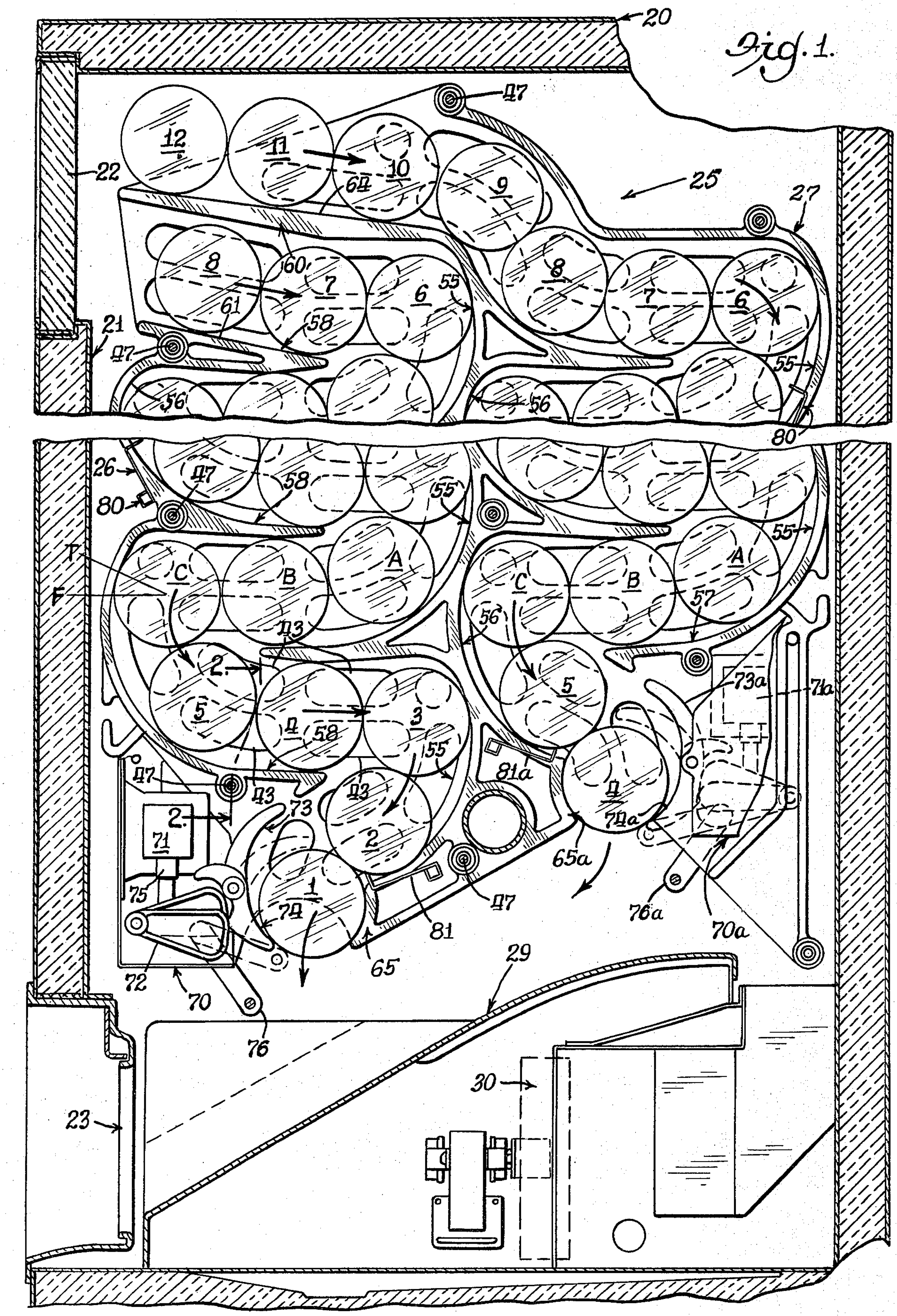
Figure 2:
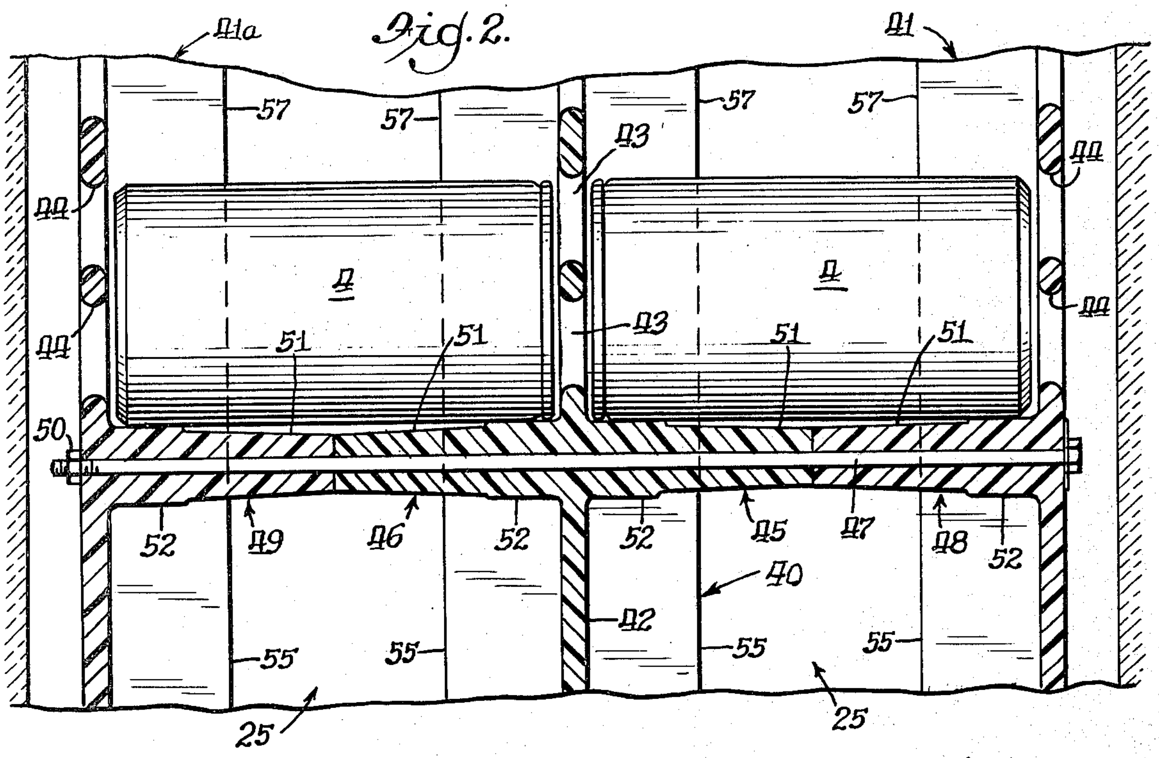

Turning now to the detailed features of the preferred embodiment of this invention illustrated in the drawings particular references made to FIGS. 1 and 2 illustrative of its structural and operational features.

As best shown in FIG. 1, a vending machine cabinet 20 formed generally as a rectangular parallelopiped and adapted for upright positioning on an underlying support or floor, is equiped with a front door 21 having a display panel portion 22 whereat sample items to be vended are represented along with selector push buttons, in accordance with known practice. Located in the frontal regions of the cabinet 20 and below the door 21 is a delivery opening 23 through which beverages selected by a cutomer are delivered. The cabinet is provided with the usual coin slot (not shown) and appropriate control circuitry for effecting the counting and crediting of deposited coins and the initiation of a vending cycle in accordance with familiar practice.

Disposed within the cabinet's interior and extending laterally thereacross are a pluraltiy of magazines holding a number of canned items to be delivered to the customer; such magazines being indicated generally by numeral 25 in FIG. 1. Each magazine has a pair of individual serpentine columns 26 and 27; number 26 designating the columns along the front of the machine and the numeral 27 representing the columns along the back wall 28 of the machine.

Located beneath the several magazines 25 in the lower regions of the cabinet is an appropriate inclined discharge chute 29 communicating with the delivery opening 23 for guiding cans released from the overdisposed magazine columns downwardly to the customer. A suitable refrigeration unit 30 is also located in the lower regions of the cabinet 20 beneath the inclined chute 29 for discharging cooled air upwardly into the cabinet's interior whereby to maintain the canned beverage in a chilled or refrigerated state.

As will best be recognized from representative FIG. 2 of the drawings, the several magazines each comprising dual serpentine columns, are formed by assembling a plurality of spaced intermediate wall members 40 with a pair of end wall members 41, 41*a*. FIG. 2 represents a foreshortened version of the general makeup of a plurality of magazines 25, normally incorporated across the width or lateral dimension of the cabinet's interior. It will be understood that a full magazine assembly, in contrast to the two magazines illustrated in FIG. 2, will be made up of a plurality of the intermediate wall members 40 in parallel abutting relationship along with the two end walls 41, 41*a* at the opposite lateral sides thereof. Be that as it may, each intermediate wall 40 comprises a generally planar central web wall section 42, preferably cast or molded from a rigid, lightweight plastic or metal. The web walls 42 of the several magazines (see FIG. 1) are invaded periodically by a plurality of limber holes 43 formed therethrough and comprising means for the passage of refrigerated ventilating air supplied by the refrigeration unit 30. Thus the plurality of cans stacked and stored in the various dual serpentine chambers are substantially surrounded with cool circulating air to maintain their refrigerated condition. As illustrated in FIG. 1 of the drawings, the plurality of limber openings, such as openings 43, extend throughout the general web wall area of the intermediate wall members 40 and a similar pattern is carried on with the end wall members 41, 41*a* as indicated at 44 in FIG. 2.

The intermediate web wall members 40 are further distinguished by a plurality of oppositely directed and coaxially aligned boss sections 45 and 46 which extend outwardly of opposite faces of the web wall 42 at selected intervals; such bosses 45 and 46 abutting with opposed boss portions of adjacent intermediate walls in the total makeup of a complete magazine whereby to accommodate tie rods 47 which extend coaxially through the hollow interiors of the aligned bosses 45 and 46. It will be noted that end wall members 41 are likewise provided with boss portions 48 and 49, each of which respectively engages a boss portion 45 or 46, as the case may be, of adjacent intermediate wall members 40. The several tie rods 47 are maintained in place by suitable fastening nuts 50, or the like, threaded over one outer end thereof outwardly of one of the side walls 41 or 41*a*, as as indicated in FIG. 2. From FIG. 1 it will be recognized that there are a plurality of such boss and tie rod arrangements throughout the length of the two serpentine columns to fabricate a rigified unified structure capable of holding a plurality of canned articles stored therein and having suitable stability to withstand imposed loads.

From FIG. 2 it also will be seen that each of the boss portions 45 and 46 associated with the intermediate wall members 40 and the corresponding boss portions 48 and 49 of the two end walls 41, 41*a* have a generally tapered or frustoconical formation as indicated at 51, which comprise undercut clearance to avoid frictional resistance with the can members. This promotes the ability of the cans to roll freely along the serpentine magazine columns. It further will be noted that each of the frustoconical sections 51 is merged into a generally cylindrical base section 52, immediately adjacent the intermediate and end wall members 40 and 41, 41*a*.

Such sections 52 constitute integral portions of guide rail members projecting integrally from opposite faces of opposing intermediate and end wall members of the magazine so as to constitute guide rails for the movement of the cans therealong. More specifically with reference to FIG. 1 it will be seen that the guide rails formed by such integral extensions of the magazine walls constitute the serpentine networks of the two separated serpentine columns; such serpentine networks comprising plural curvelinear flight sections or portions 55, oppositely directed curvelinear flight sections or portions 56, and generally horizontal and oppositely directed flight sections or portions 57, 58. Each of the curvelinear flight sections 55 merges with a horizontal flight section 57 as best shown in FIG. 1. Correspondingly the curvelinear flight sections 56 merge into generally horizontal flight sections 58 as also shown.

Inasmuch as the curvelinear sections 55 and 56 are oppositely directly and each of the serpentine columns is made up of the combined flight sections 55, 56, 57 and 58, it will be recognized that the net resulting patterns for the two columns 26 and 27 consitute generally identical serpentine paths disposed in side by side, front to back relationship within each magazine 25. The only variations of the two serpentine columns occur at the upper loading ends thereof and at their lower dishcarge ends, as will be described in greater detail presently.

Turning now to the features of the upper loading ends of the two serpentine columns 26 and 27, it will be noted that column 26 for example, has a loading end defined by and between an elongated section 60 of the uppermost curvelinear flight section 55 thereof and a modified flight section 58 having a straight line or planar upper surface 61 paralleling section 60 and leading into the entry of flight section 55. The underside of section 60 has a planar face which slopes slightly downwardly in parallelism with the upper side of surface 61 to define a rectangular channel opening receptive of canned articles, as indicated at 8, 7 and 6 in FIG. 1. Thus column 26 may be loaded from top to bottom by merely rolling the cans downwardly along its internal track until the appropriate number of cans are deposited therein. It will be understood, of course, that the column 26 of FIG. 1 is foreshortened; the number of turns in the serpentine columns being varied depending on the height limitations of the vending machine cabinet.

The upper or loading end of column 25 has an extended throat which overlies column 26 and is defined by the wall section 60 and an extension 63 of its uppermost curvelinear flight section 55 (i.e. the first or uppermost turn in the serpentine column 27). Basically, extension 63 generally follows the form of the cooperating and opposite flight section 58 which defines the first such flight or run in column 27. Also the upper face 64 of the wall section 60 is generally planar with a slight downward slope, as indicated in FIG. 1. It will be noted that between the outer end of the loading throat of the secondary column 27 and the turn defined by its first curvelinear flight section 55, there are seven cans numbered 6 through 12 as shown in that Figure; the significance of which will appear presently.

Figure 3:
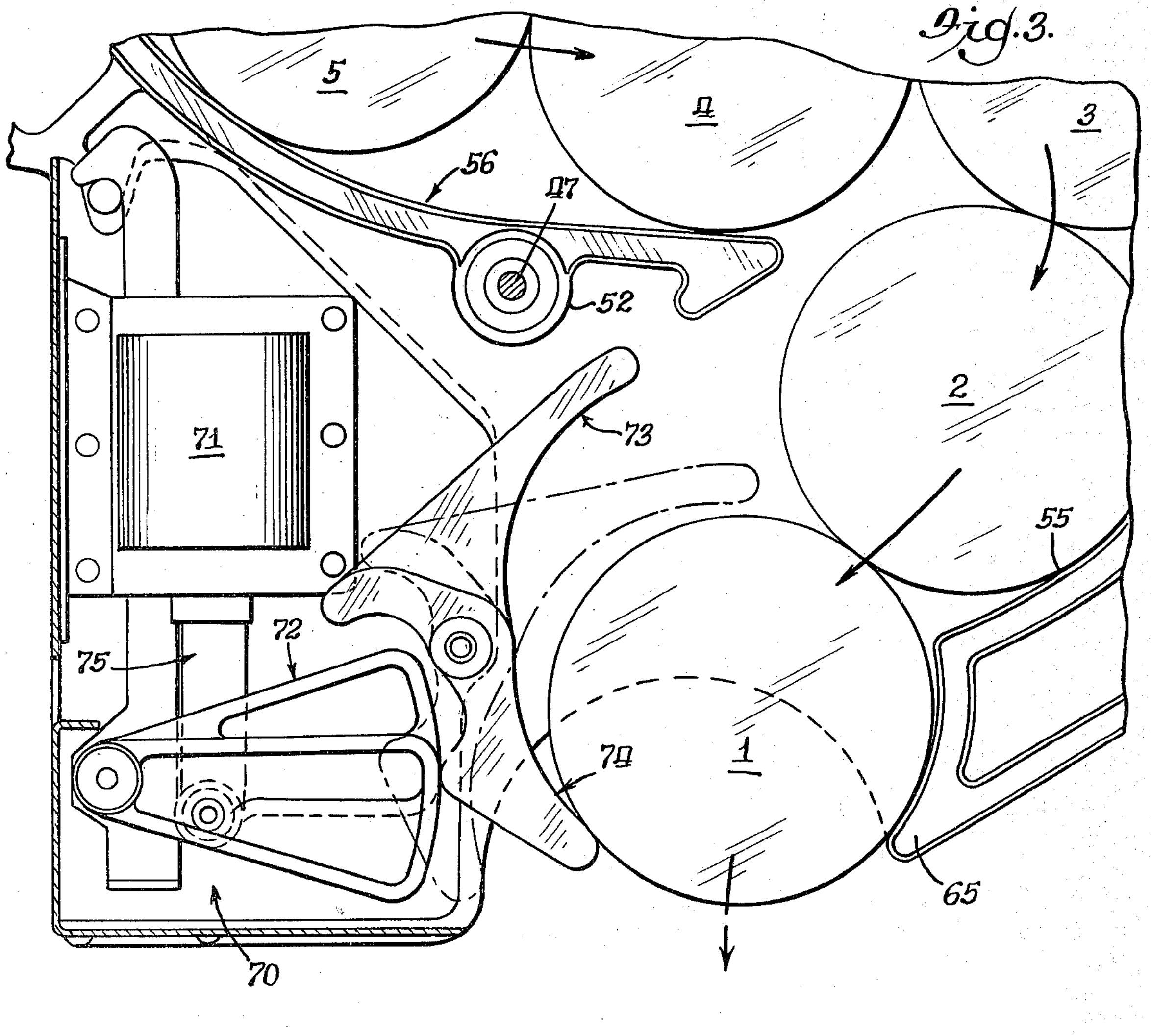

Turning now to the lower or discharge ends of the two columns 26 and 27, it will be seen from FIGS. 1 and 3 that the lower end of column 26 comprises a generally shortened curvelinear flight section 55; the lower end of such section 55 being abbreviated and turned downwardly, to provide a stationary gate section 65. Opposite the open discharge end of the column 26 (particularly gate section 65) is a removably mounted vend mechanism, indicated at 70, which is adapted to discharge cans from column 26 one-by-one in response to periodic energization of an associated electro-magnetic solenoid 71. Solenoid 71 activates an appropriate cam member 72 to operate pivotal upper and lower vend gates 73 and 74. Generally the features of a vend mechanism in accordance with the mechanism 70 illustrated, are set forth in U.S. Pat. No. 3,613,945 of Oct. 19, 1971 with the exception of the illustrated upper and lower vend gates 73 and 74.

Briefly, in reponse to actuation of the cam means 72 in accordance with actuation of the solenoid 71 and its core member 75, the lower vend gate 74 is swung or moved clockwise to its dotted line position in FIG. 3 to permit the escape of the bottommost can (1) of the stacked array thereover, as shown. This permits the can held between gate 74 and the curved end of gate section 65 to drop vertically a short distance to the underdisposed inclined discharge chute 29, leading to the customer delivery opening 23. Meanwhile as the lower vend gate 74 is swung to it's can releasing position, the upper vend gate 73, having a longer reaching arm, has previsously swung in a clockwise sense to its dotted line position of FIG. 3. This effectively blocks the next can (number 2 in FIGS. 1 and 3), preventing the latter from escaping before and while can (1) is discharged. After the discharge of can (1) reverse operating activity of the lower and upper vend gates takes place, such moving counterclockwise to their full line positions as shown in FIGS. 1 and 3. In this condition the lower vend gate 74 is in blocking position with respect to the now lowermost can (2) in the column as the upper vend gate is swung to a noninterfering condition to release that can, thereby permitting the same to advance into a discharge position between gate 74 and the fixed gate 65.

With regard to the lower or discharge end of the secondary column 27, it will be recognized from FIG. 1 that the discharge end of that column is disposed at a higher elevation than the dicharge end of column 26 and that the same is formed principally by an interrupted oppositely directed curvelinear flight section 56 having a downwardly turned static gate section *65a*. In effect the generally horizontally disposed flight section 58, which would normally communicate with the lowermost section 56, is eliminated from the serpentine path. As a consequence the can corresponding to can number (4) in column 26, becomes the lowermost can in column 27; the discharge of which is regulated by a second vend mechanism *70a* having associated upper and lower vend gates *73a* and *74a* operable as previously described.

It is to be noted that vend gate *70a* is at the rearmost part of the machine, beneath the secondary serpentine column 27, and is reversely positioned from vend mechanism 70 associated with the frontal column 26. However, as before, upon appropriate activation of its associated solenoid *71a* the lower vend gate *74a* is moved (in this instance counterclockwise) to permit the escape of the lowermost can (4) from between gate *74a* and section *65a* while holding the next can (5) with its upper vend gate *73a*, etc.

It will be appreciated that with this arrangement, cans numbered 1, 2 and 3 in column 26, constituting the illustrative first, second and third cans from the dicharge end thereof, are eliminated from the secondary column 27. However, it also will be recalled that the upper or loading end of column 27 includes four more cans than the loading end of column 26. As a consequence column 27 in fact holds one more can, when fully loaded, than column 26 due principally to the elongated loading end of the secondary column 27 which reaches over the top of column 26, as illustrated.

In addition to the vend mechanism 70 and *70a* as described, each of the columns is equiped with a manually operated hold bar 76, *76a*, illustrated in FIG. 1 in noninterfering positions relative to the columns 26 and 27. The interfering positions therefor are indicated by dotted lines in FIG. 1. Each hold bar works independently of its adjacent vend mechanism and is utilized to hold back the cans in each of the columns when it is desired to remove the assocated vend mechanims 70 or *70a* inasmuch as the vend mechanisms are readily disassociated from their mounting position for purposes of repair or replacement, generally in accordance with the teachings of the aforesaid U.S. Pat. No. 3,613,945.

It will be recalled that the intermediate flight sections of the serpentine tracks such as sections 57 and 58 have been described above as being generally horizontal and that is substantially the case. As a consequence, as the downwardly or gravitationally moving cans transit from a curvelinear flight section, such as section 55, to a substantially horizontal flight section 57, the can B (see FIG. 1) supported on that flight section 57 is generally on a horizontal plane and is subject to very little if any downward force from other cans of the column (see overdisposed can A) due to its full support by the underlying flight section 57. This condition obtains on all flight sections 57 or 58. The adjacent can A supported at the lower end of the infeeding curvelinear flight section 55, on the other hand, is subjected to a gravitational force tending to roll the same downwardly toward the horizontal flight section 57. The downward gravitational force exerted on can A is translated into substantially horizontal force exerted on the adjacent can B. That horizontal force in turn is transmitted to the next can C in the upper end of the next adjacent reversely directed flight section 56 as indicated by the arrow F in FIG. 1. Thus, insofar as the forces acting on cans B and C at each of the turns within the serpentine paths for the two columns are concerned, there is only horizontal force applied from the preceeding cans in each column.

Because of this arrangement, it will be noted that each can C, as exemplified in FIG. 1, has a point of tangency T which is disposed angularly above the horizontal force line F. Since there is no vertical component acting on can C from cans B or A, as related, can C is pressed tightly against the curvelinear wall of the flight section 56 in accordance with resolution of the force F; productive of a component applied at the point of tangency T. Inasmuch as the line of force F on the can C is below the point of tangency, the tendency of that can is to gravitate freely downwardly into the upper end of the next succeeding curvelinear flight section 58 as permitted by movement of the can therebeneath (can 5 in column 26 of FIG. 1). Thus, there is very little likelihood of having a can C hang up in the curvelinear path of the flights 55 or 56. Cans B of course, are moved horizontally by the forces exerted by can A.

Of still further significance in the above described arrangement generated by the substantial horizontal disposition of the flight sections 58 and 57, is the fact the two vending mechanisms 70 and *70a* are substantially relieved of the weight of the entire overdisposed column of cans since the load thereon is limited to the preceeding three cans in the illustrated case, namely cans 1, 2 and 3 in column 26 and cans 4, 5 and C in column 27. This is particularly important in the case of so-called thin wall containers made of lightwieght metal. Under previous practice of heretofore known can vending magazines, such lightweight or thin wall cans are susceptable to crushing at the vending mechanism, creating jams in the magazine columns principally due to the fact that the entire weight of the overdisposed column is carried or imposed on the bottommost can of the column. This is not the case in accordance with the present invention as above described. As an added advantage to the limitation of the weight imposed at the vending mechanisms, it will be readily recognized that the removable feature of the vending mechanism 70, 70*a*, in accordance with the present teaching, is thus greatly facilitated and that the hold bars 76, 76*a* are required merely to hold back and support the weight of the first three cans in the column instead of the entire column in operation.

While the foregoing description sets forth the novel features of the present invention, it should be noted that each of the columns 26 and 27 is equipped with one or more load sensing switches 80 at various positions along the serpentine path thereof as well as a pair of sold out switches 81, 81*a* located substantially at the throat at the dicharge end for each of the columns 26 and 27. The sensing switches 80 cooperate with timing devices and circuit logic to maintain operating circuitry to the vend mechanisms and determine the presence of can movement in each column, a jammed condition, if present, or to "hold" a column for cooling purposes. The sold out switches 81, 81*a* serve primarily to determine when the last can in the associated magazine column has moved therepast to a discharge position and to initiate a "sold out" signal.

In operation, the columns may be depleted in successive or alternate fashion, depending on the desired operational sequence of the vend mechanisms 70 and 70*a*. Preferably the columns 26 and 27 are depleted alternatively, one can out of column 26 followed by one can out of column 27, etc.

In addition, accommodation of different diameter canned articles is readily brought about by appropriate alteration of the length or extension of the vend gate 74 into the discharge opening or by revising cam 72 to effect an adjustment of the opening and closing throw of such vend gate whereby larger or smaller diameter cans may be dispensed from the magazine.

Having thus described this invention it is believed that those familiar with the art will readily recognize and appreciate its novel aspects and advancement over prior vending machine magazines and will understand that while the same has been hereinabove described in association with a particular embodiment illustrated in the drawings, the same is nevertheless susceptable to variations of materials and substitutions of parts and equivalents without departing from the spirit and scope of the invention.

The embodiments of the invention in which an exclusive property or privilege is claimed are defined as follows:

1. For use in an automatic coin controlled machine for vending cylindrical articles, a magazine for holding a plurality of generally cylindrical articles, comprising: a pair of laterally spaced wall members having abuttable means projecting integrally from opposing faces thereof and disposed at selected spaced locations thereon, means interconnecting said wall members with opposing said abuttable means engaging one; each of said wall members having a plurality of oppositely directed, vertically and laterally spaced, curvilinear flight sections, each merging at its lower end with a horizontal flight section extending toward an opposing said curvilinear flight section; said flight sections being formed integrally with and projecting outwardly from a said wall member so that corresponding flight sections on opposed faces of said pair of wall members are in abutting alignment to formulate a pair of laterally spaced, vertical serpentine columns therebetween; each column having two laterally spaced serpentine tracks for movement of articles therealong; said pair of serpentine columns being substantially alike and arranged in nonoverlapping, front-to-back spaced relationship within their associated magazine; each said column having an open loading end at the upper end thereof, with the rearmost of the columns having its loading end disposed above the loading end of the foremost of said columns; an open discharge end at the lower end of each said column, with the discharge end of the foremost of said columns releasing articles toward the front of the machine and the discharge end of the rearmost of said columns releasing articles toward the rear of said machine; and a periodically operable vend mechanism mounted opposite the lower discharge end of each of said columns and operable to release articles one-by-one therefrom.

2. The combination of claim 1, wherein the rearmost serpentine column of each pair has an article carrying capacity exceeding that of the foremost column of each pair.

3. The combination of claim 1, wherein the horizontal flight sections of each column undersupport the total weight of articles thereon; the curvilinear flight sections thereof being formed to resolve the weight of articles therein into horizontal forces whereby articles supported on the horizontal flight sections of each column are not subject to the weight load of articles thereabove.

4. The combination of claim 1, wherein the arrangement of curvilinear and horizontal flight sections of each column is such as to restrict the weight load imposed on the vend mechanism at the lower end thereof to the effective gravitational force imposed by only those articles located between said vend mechanism and the first horizontal flight section adjacently thereabove.

5. The combination of claim 1, and manually operable hold bar means located at the lower end of each column for selectively blocking the movement of articles; each said hold bar means being subjected to the same vertical load as the vend mechanism of its associated column whereby the latter is removable from the machine without emptying its associated column of articles when said hold bar means is in article blocking position.

6. The combination of claim 1, and static gate means at the lower discharge end of each column for cooperation with the associated said vend mechanism thereat; said vend mechanism comprising movable upper and lower gate means, and said static gate means cooperating with said lower gate means to hold articles in escrow pending release by said vend mechanism.

* * * * *